US011014520B2

(12) United States Patent
Murakami et al.

(10) Patent No.: US 11,014,520 B2
(45) Date of Patent: May 25, 2021

(54) AIRBAG APPARATUS AND SEATBELT APPARATUS

(71) Applicant: Joyson Safety Systems Japan K.K., Tokyo (JP)

(72) Inventors: Yoshiki Murakami, Shiga (JP); Hiroaki Isozaki, Shiga (JP)

(73) Assignee: Joyson Safety Systems Japan K.K., Tokyo (JP)

( * ) Notice: Subject to any disclaimer, the term of this patent is extended or adjusted under 35 U.S.C. 154(b) by 94 days.

(21) Appl. No.: 16/610,163

(22) PCT Filed: May 21, 2018

(86) PCT No.: PCT/JP2018/019547
§ 371 (c)(1),
(2) Date: Nov. 1, 2019

(87) PCT Pub. No.: WO2018/216663
PCT Pub. Date: Nov. 29, 2018

(65) Prior Publication Data
US 2020/0377049 A1    Dec. 3, 2020

(30) Foreign Application Priority Data

May 22, 2017 (JP) .............................. JP2017-100586

(51) Int. Cl.
*B60R 21/18* (2006.01)
*B60R 22/18* (2006.01)
(Continued)

(52) U.S. Cl.
CPC .............. *B60R 21/18* (2013.01); *B60R 22/14* (2013.01); *B60R 21/237* (2013.01);
(Continued)

(58) Field of Classification Search
CPC .............................. B60R 21/18; B60R 22/14
See application file for complete search history.

(56) References Cited

U.S. PATENT DOCUMENTS 5,466,003 A * 11/1995 Tanaka ............... A44B 11/2523
280/733
6,189,921 B1 * 2/2001 Takeuchi ................ B60R 21/18
280/733
(Continued)

FOREIGN PATENT DOCUMENTS

DE         19724191        3/1998
DE        102010022010     12/2011
(Continued)

OTHER PUBLICATIONS

International Search Report for PCT/JP2018/019547 dated Jul. 31, 2018.

*Primary Examiner* — Barry Gooden, Jr.
(74) *Attorney, Agent, or Firm* — IPUSA, PLLC

(57) ABSTRACT

An airbag apparatus includes a longitudinal webbing guide configured to guide movement in a longitudinal direction of webbing, an inflatable airbag disposed along an outer side of the webbing guide, a bag cover configured to cover the airbag, and an upper side coupling member configured to couple a guide upper end of the webbing guide to a cover upper end of the bag cover, and move upward along the webbing together with the airbag when the airbag is inflated and deployed. A seatbelt apparatus includes the airbag apparatus.

11 Claims, 19 Drawing Sheets

(51) Int. Cl.
  *B60R 22/14*    (2006.01)
  *B60R 21/237*   (2006.01)
  *B60R 21/235*   (2006.01)
  *B60R 21/261*   (2011.01)

(52) U.S. Cl.
  CPC ............ *B60R 2021/23519* (2013.01); *B60R 2021/2612* (2013.01); *B60R 2022/1812* (2013.01)

(56) References Cited

U.S. PATENT DOCUMENTS

| | | | |
|---|---|---|---|
| 6,382,666 B1* | 5/2002 | Devonport | B60R 21/18 280/730.1 |
| 6,460,881 B1* | 10/2002 | Adomeit | B60R 21/18 280/730.1 |
| 8,408,594 B2 | 4/2013 | Kibat | |
| 9,963,098 B2* | 5/2018 | Isozaki | B60R 21/18 |
| 10,183,646 B2* | 1/2019 | Murakami | B60R 22/18 |
| 10,710,538 B2* | 7/2020 | Kim | B60R 22/14 |
| 10,913,421 B2* | 2/2021 | Sung | B60R 21/207 |
| 2002/0171233 A1* | 11/2002 | Grace | B60R 21/18 280/733 |
| 2009/0051150 A1* | 2/2009 | Murakami | B60R 21/18 280/733 |
| 2012/0306185 A1 | 12/2012 | Kim et al. | |
| 2013/0221642 A1* | 8/2013 | Arnold | B60R 21/18 280/733 |
| 2013/0264804 A1* | 10/2013 | Czach | B60R 21/18 280/733 |
| 2014/0353950 A1* | 12/2014 | Yamataki | B60R 21/18 280/728.2 |
| 2016/0280171 A1* | 9/2016 | Moeller | B64D 11/06205 |
| 2017/0106828 A1* | 4/2017 | Isozaki | B60R 21/2338 |
| 2017/0327075 A1* | 11/2017 | Murakami | B60R 21/18 |
| 2017/0349130 A1* | 12/2017 | Faruque | B60R 21/18 |
| 2018/0281726 A1* | 10/2018 | Murakami | B60R 21/18 |
| 2019/0176738 A1* | 6/2019 | Kim | B60R 21/18 |
| 2019/0283699 A1* | 9/2019 | Park | B60R 21/207 |
| 2020/0164823 A1* | 5/2020 | Sung | B60R 21/26 |
| 2020/0254953 A1* | 8/2020 | Jessup | B60R 22/023 |

FOREIGN PATENT DOCUMENTS

| | | | |
|---|---|---|---|
| DE | 102011055068 | | 12/2012 |
| DE | 102011116146 | | 4/2013 |
| EP | 1087878 | | 8/2004 |
| GB | 2405840 | | 3/2005 |
| JP | 2001-260807 | | 9/2001 |
| JP | 2001260807 | A * | 9/2001 |
| JP | 2004-42694 | | 2/2004 |
| JP | 2008-100649 | | 5/2008 |
| JP | 2009-001223 | | 1/2009 |
| JP | 2009-029357 | | 2/2009 |
| JP | 2012-179939 | | 9/2012 |
| JP | 2013-184559 | | 9/2013 |
| JP | 2016-002822 | | 1/2016 |
| JP | 2017-206223 | | 11/2017 |
| WO | 01/68412 | | 9/2001 |
| WO | 2008/139655 | | 11/2008 |
| WO | 2015/190152 | | 12/2015 |

* cited by examiner

AIRBAG APPARATUS AND SEATBELT APPARATUS

TECHNICAL FIELD

The present invention relates to an airbag apparatus and a seatbelt apparatus.

BACKGROUND ART

Conventionally, a seatbelt apparatus including a bag assembly is known. The bag assembly is slidably supported by webbing and includes a bag that inflates to restrain an occupant (see Patent Document 1, for example).

CITATION LIST

Patent Document

Patent Document 1: Japanese Laid-open Patent Publication No. 2001-260807

SUMMARY OF THE INVENTION

Problem to be Solved by the Invention

However, in the related-art technology, the upper end of the bag assembly is fixed to the webbing when the bag is inflated. Thus, the length in the longitudinal direction of the bag assembly does not change before and after the inflation of the bag. For this reason, the size of the bag assembly before the inflation of the bag tends to be large. If the size of the bag assembly before the inflation of the bag is large, the ease of installing the bag assembly in a vehicle may be decreased.

In light of the above, the present disclosure provides an airbag apparatus whose size, before the inflation of an airbag, is reduced, and also provides a seatbelt apparatus including the airbag apparatus.

Means to Solve the Problem

According to an aspect of the present disclosure, an airbag apparatus is provided that includes a longitudinal webbing guide configured to guide movement in a longitudinal direction of webbing, an inflatable airbag disposed along an outer side of the webbing guide, a bag cover configured to cover the airbag, and an upper side coupling member configured to couple a guide upper end of the webbing guide to a cover upper end of the bag cover, and move upward along the webbing together with the airbag when the airbag is inflated and deployed.

According to another aspect of the present disclosure, a seatbelt apparatus including the airbag apparatus is provided.

Effects of the Invention

According to an aspect of the present disclosure, an upper side coupling member moves upward along webbing together with an airbag when the airbag is inflated and deployed. Accordingly, the length in the longitudinal direction of an airbag apparatus before the inflation of the airbag can be reduced as compared to after the inflation of the airbag. Thus, the size of the airbag apparatus before the inflation of the airbag can be reduced.

MODE FOR CARRYING OUT THE INVENTION

Figure 1:
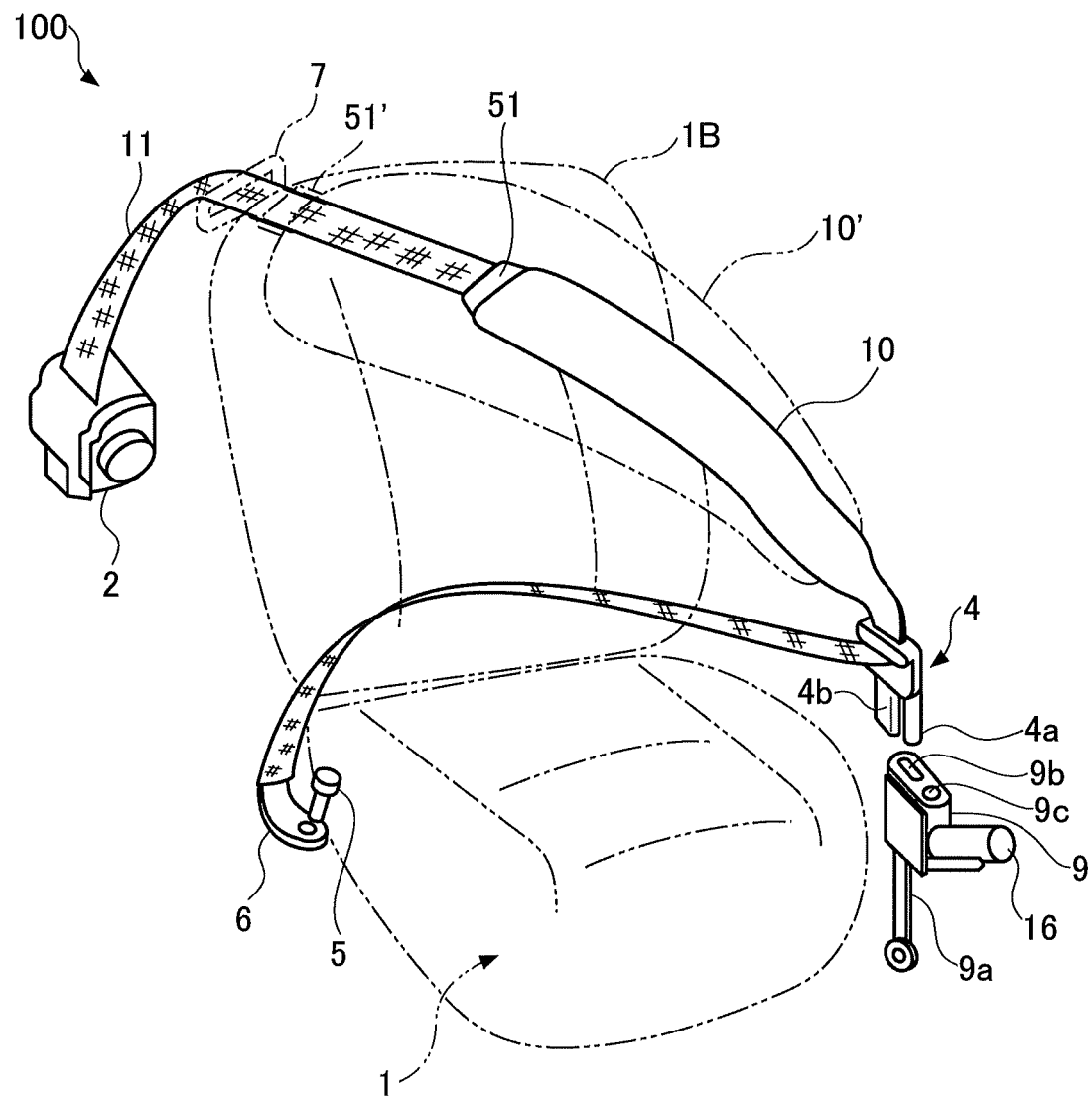
FIG. 1 is a drawing illustrating an example of a configuration of a seatbelt apparatus according to an embodiment.

In the following, embodiments of the present invention will be described with reference to the accompanying drawings. In the drawings, an X-axis, a Y-axis, and a Z-axis are orthogonal to each other. An X-axis direction, a Y-axis direction, and a Z-axis direction respectively indicate a direction parallel to the X-axis, a direction parallel to the Y-axis, and a direction parallel to the Z-axis. An XY plane, a YZ plane, and a ZX plane respectively indicate a plane including the X-axis and the Y-axis, a plane including the Y-axis and the Z-axis, and a plane including the Z-axis and the X-axis.

FIG. 1 is a perspective view schematically illustrating an example of a configuration of a seatbelt apparatus according to an embodiment. A seatbelt apparatus 100 illustrated in FIG. 1 is installed on a seat 1 of a vehicle. The seatbelt apparatus 100 includes a retractor 2, webbing 11, an air belt 10, a shoulder anchor 7, a tongue 4, and a buckle 9.

The webbing 11 pulled out of the retractor 2 passes through the shoulder anchor 7 and is turned at the tongue 4. The end of the webbing 11 is fixed to an anchor plate 6. The anchor plate 6 is fixed to a fixing portion (not illustrated) of a vehicle body with a fixing bolt 5.

For example, the seat 1 may be a front seat such as a driver's seat or a front passenger seat. The seat 1 may also be a rear seat.

The retractor 2 is a device that extends and retracts the webbing 11, and is provided in a B-pillar in the present embodiment. However, depending on the position of the seat 1, the retractor 2 may be provided in or attached to a location other than the B-pillar, such as a C-pillar or a vehicle body part such as a tray behind the rear seat. Further, the retractor 2 may be provided inside the seat 1 (inside a backrest 1B, for example).

The tongue 4 is slidably attached to the webbing 11, and the air belt 10 is fitted to the webbing 11 on the shoulder anchor 7 side relative to the tongue 4. The tongue 4 includes a gas supply pipe 4a and a tongue plate 4b. The gas supply pipe 4a has a cylindrical shape and is made of metal. The gas supply pipe 4a communicates with a gas inlet port 21 at the lower end of an airbag 20, which is described later and illustrated in FIG. 3, through a gas supply path in the tongue 4 that communicates with the gas supply pipe 4a.

Figure 2:
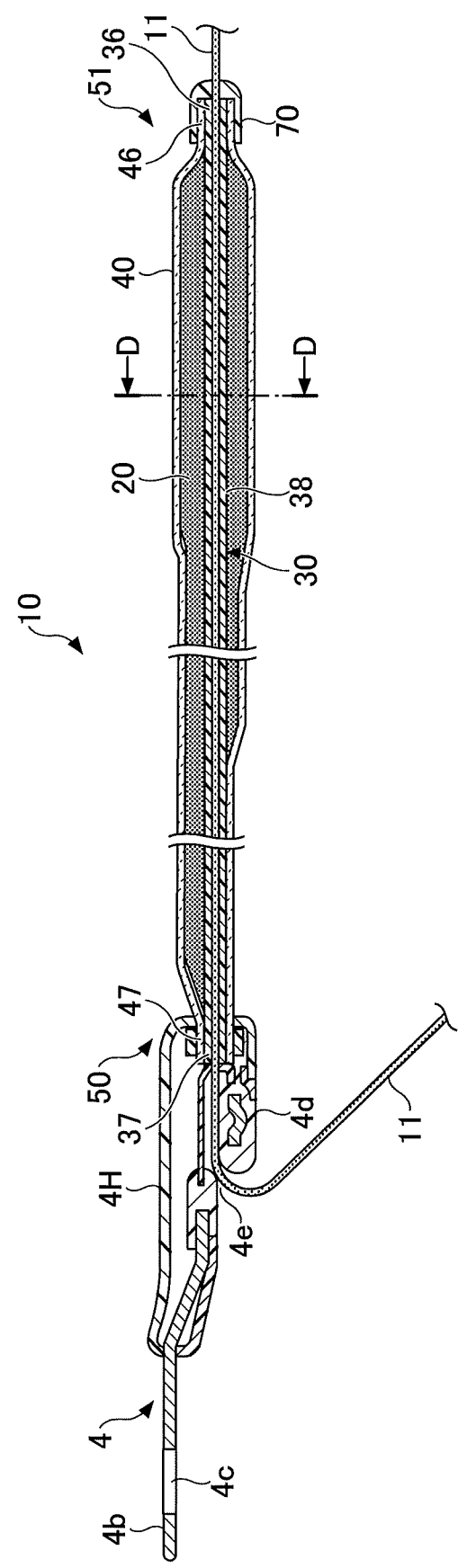
FIG. 2 is a cross-sectional view of the vicinity of the tongue and the airbag of the seatbelt apparatus according to the embodiment.

FIG. 2 is a cross-sectional view of the vicinity of the tongue and the airbag of the seatbelt apparatus according to the embodiment. A latch member of the buckle 9 engages with a latch hole 4c when the tongue plate 4b is inserted into the buckle 9. The latch hole 4c is provided at the front end of the tongue plate 4b of the tongue 4. The rear end of the tongue plate 4b is embedded in a resin mold 4d. The resin mold 4d is provided with an insertion port 4e through which the webbing 11 is inserted.

In FIG. 1, the buckle 9, to and from which the tongue 4 is attached and removed, is fixed to a fixing portion (not illustrated) of the seat or the vehicle body through a bracket 9a with a fixing member such as a bolt. A tongue plate supporting hole 9b and a gas supply pipe coupling hole 9c are formed in the buckle 9. In order to attach the tongue 4, the tongue plate 4b and the gas supply pipe 4a are respectively inserted into the hole 9b and the hole 9c of the buckle 9. An inflator 16 is provided at the buckle 9. A gas ejection port (not illustrated) of the inflator 16 communicates with the gas supply pipe coupling hole 9c into which the gas supply pipe 4a is inserted. During a collision and the like, gas is ejected from the gas ejection port of the inflator 16 by the reaction of an ignition agent in the inflator 16, causing the air belt 10 to inflate along the webbing 11 as illustrated by a long-dash double-short-dash line 10' of FIG. 1. The air belt 10 moves upward (towards the shoulder anchor 7 in the present embodiment) along the longitudinal direction of the webbing 11 while being inflated and deployed.

In FIG. 2, the air belt 10 is an example of an airbag apparatus. The air belt 10 includes a webbing guide 30 into which the webbing 11 is inserted, the inflatable airbag 20 extending along the webbing guide 30, and a bag cover 40 covering a folded body of the airbag 20. The airbag 20 is folded into an elongated shape in the insertion direction of the webbing guide 30, and is disposed along the outer side of the webbing guide 30. The air belt 10 also includes a lower side coupling member 50 that couples the lower ends of the webbing guide 30 and the bag cover 40 to the tongue 4, and also includes an upper side coupling member 51 that couples the upper ends of the airbag 20, the webbing guide 30, and the bag cover 40 to each other.

The bag cover 40 includes a cover upper end 46, and the webbing guide 30 includes the guide upper end 36 alongside the cover upper end 46. The cover upper end 46 is an example of a first cover end in the insertion direction of the webbing 11. The guide upper end 36 is an example of a first guide end alongside the first cover end. In addition, the bag cover 40 includes a cover lower end 47, and the webbing guide 30 includes a guide lower end portion 37 alongside the cover lower end 47. The cover lower end 47 is an example of a second cover end on the opposite side of the first cover end in the insertion direction of the webbing 11. The guide lower end portion 37 is an example of a second guide end alongside the second cover end.

The webbing guide 30 has a peripheral wall 38 continuously extending between the guide upper end 36 and the guide lower end portion 37. Because the peripheral wall 38 continuously extends between the guide upper end 36 and the guide lower end portion 37, discontinuities such as holes and gaps are not formed in the peripheral wall 38. Therefore, it is possible to prevent foreign matter from entering between the bag cover 40 and the webbing guide 30 via the peripheral wall 38.

The longitudinal webbing guide 30 guides movement in the longitudinal direction of the webbing 11. The airbag 20 is disposed along the outer side of the webbing guide 30. When the airbag 20 is in a non-inflated and non-deployed state, the upper side coupling member 51 couples the guide upper end 36 of the webbing guide 30 to the cover upper end 46 of the bag cover 40. When the airbag 20 is in an inflated and deployed state, the upper side coupling member 51 moves upward in the longitudinal direction of the webbing 11 together with the airbag 20 when the airbag 20 is inflated and deployed (see long-dash double-short-dash lines 10' and 51' of FIG. 1).

As described above, the air belt 10 includes the upper side coupling member 51, which is moved upward along the webbing 11 together with the airbag 20 when the airbag 20 is inflated and deployed. By including the upper side coupling member 51, the length in the longitudinal direction of the air belt 10 before inflation and deployment of the airbag 20 can be reduced, as compared to after inflation and deployment of the airbag 20. As a result, installation of the air belt 10 in a vehicle is easier. Further, the size of the air belt 10 during normal use of the air belt 10 before inflation and deployment of the airbag 20 may be kept at a minimum. Thus, the air belt 10 causes less discomfort to an occupant during normal use of the air belt 10.

Figure 3:
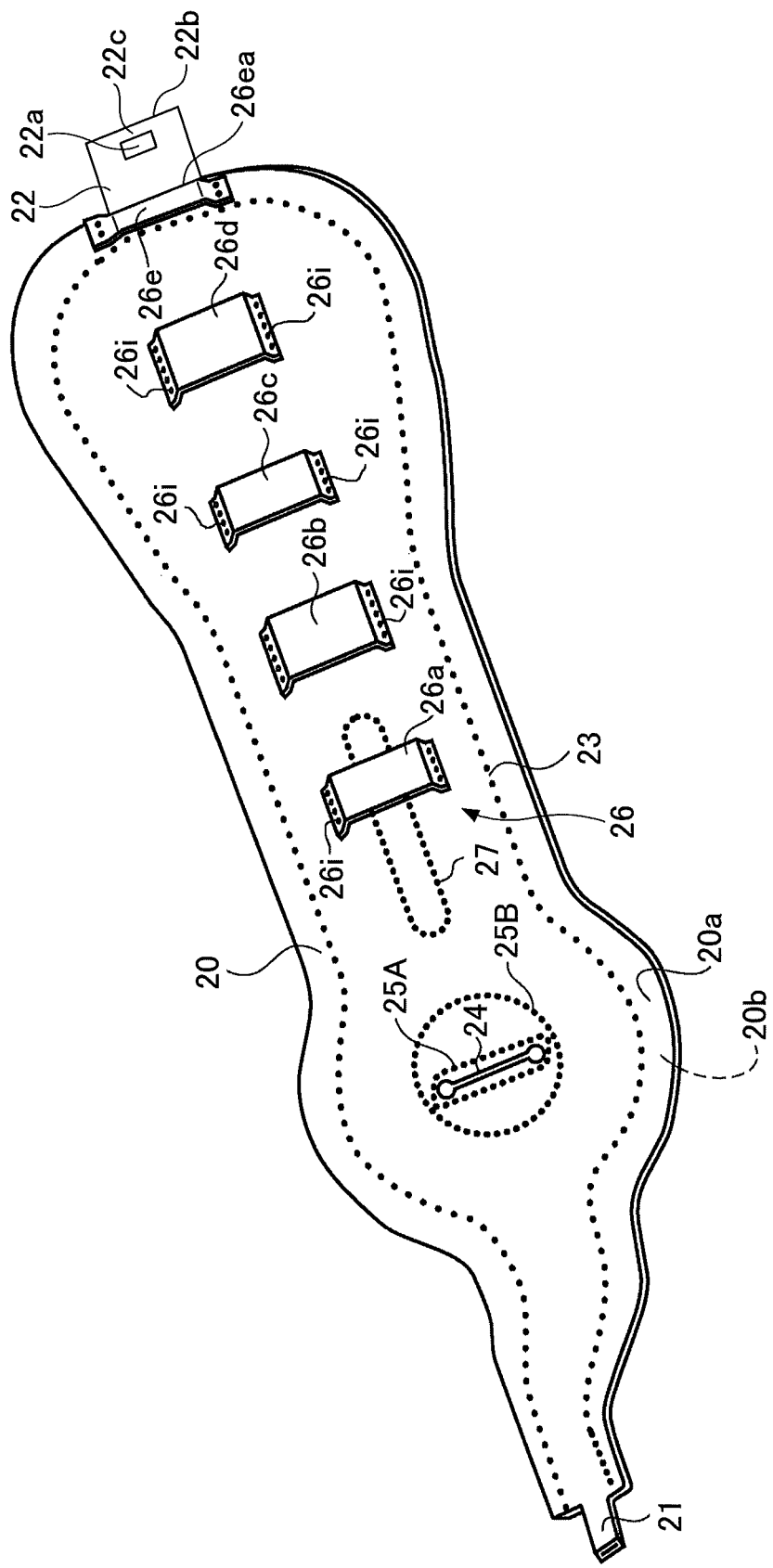
FIG. 3 is a perspective view of the airbag when spread flat.

FIG. 3 is a perspective view of an example of the airbag when spread flat. The airbag 20 includes the gas inlet port 21 at its lower end (on the tongue 4 side). The airbag 20 extends in an elongated shape so as to extend along the webbing 11. A projecting portion 22 is provided at the upper end (on the shoulder anchor 7 side) of the airbag 20. The projecting portion 22 is provided with an engaging hole 22a. The projecting portion 22 is an example of a bag upper end of the airbag 20.

Two elongated base fabrics 20a and 20b are overlaid and the peripheral edges of the fabrics 20a and 20b are sewn together with a sewing thread 23, such that the airbag 20 is made in an elongated bag-like shape.

A slit 24 for passing the webbing guide 30 through the airbag 20 from the base fabric 20a side to the opposite base fabric 20b side is provided on the lower end side (the tongue 4 side) of the airbag 20 relative to the center in the longitudinal direction of the airbag 20. The base fabrics 20a and 20b are sewed around the slit 24 with a sewing thread 25A and a sewing thread 25B.

A plurality of loops 26 for passing the webbing guide 30 are provided at spaced apart positions from near the center in the longitudinal direction of the airbag 20 to the upper end (the projecting portion 22 side) of the airbag 20. In the present embodiment, five loops 26a through 26e projecting from the surface of the base fabric 20a are provided. The loops 26 are made of fabric. Both ends of each of the loops 26 are sewn to the base fabric 20a of the airbag 20 with sewing threads 26i.

The base fabrics 20a and 20b are sewn together with a sewing thread 27 at a position near the center both in the longitudinal direction and in the width direction of the airbag 20. By sewing the base fabrics 20a and 20b with the sewing thread 27 and with the sewing thread 25B, the thickness of the inflated airbag 20 is restricted.

Figure 4:
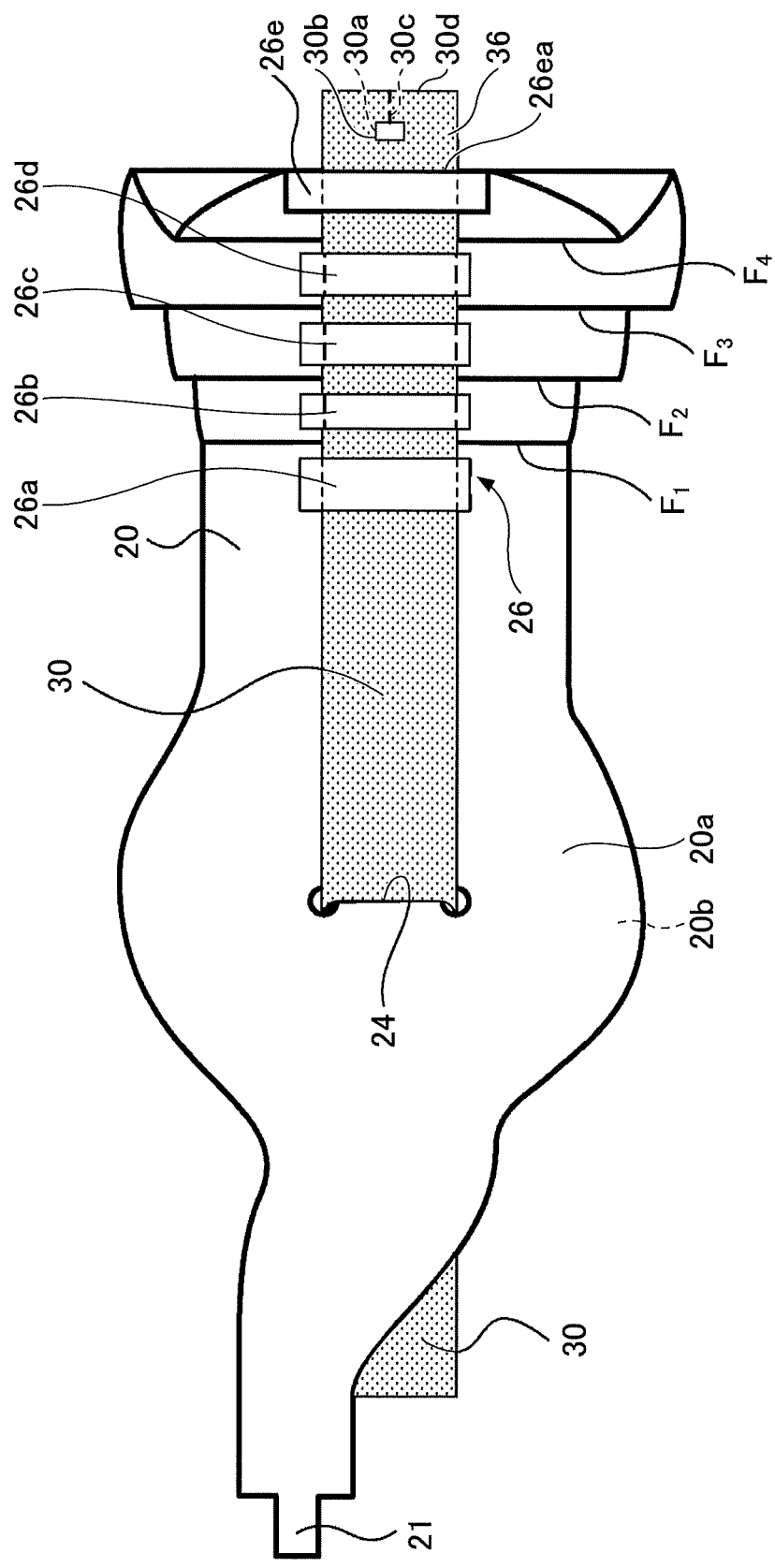
FIG. 4 is a drawing illustrating an example in which the upper portion of the airbag is folded.

FIG. 4 is a drawing illustrating an example in which the upper portion of the airbag is folded. The webbing guide 30 is inserted between each of the loops 26 and the base fabric 20a in a direction connecting the slit 24 and the projecting portion 22 (see FIG. 3). Although not illustrated in FIG. 4, the webbing 11 is inserted into the webbing guide 30. As illustrated in FIG. 4, the webbing guide 30 is inserted between each of the loops 26 and the base fabric 20a, passes through the slit 24 from the base fabric 20a side to the base fabric 20b side, and extends to near the gas inlet port 21. As illustrated in FIG. 2, the webbing guide 30 extends continuously from the cover lower end 47 to the cover upper end 46 of the bag cover 40.

The webbing guide 30 is a flat and elongated tubular member into which the webbing 11 is movably inserted. The webbing guide 30 is formed of a resin material such as polyurethane resin and silicone elastomer. The webbing guide 30 is provided with a pair of engaging holes 30a and 30b (see FIG. 4 and FIG. 5) at the guide upper end 36 thereof. Other than the engaging holes 30a and 30b; no holes are formed on the side surfaces in the longitudinal direction of the webbing guide 30. Therefore, even if foreign matter enters the inside of the webbing guide 30, it is possible to prevent the foreign matter from entering between the airbag 20 and the bag cover 40.

At the guide upper end 36, the first engaging hole 30a is formed on a first side surface of the pair of opposing side surfaces. The second engaging hole 30b is formed on a second side surface of the pair of opposing side surfaces.

After the webbing guide 30 is inserted through the loops 26 and the slit 24, the projecting portion 22 side of the airbag 20 is folded several times along folding lines F1 to F4, such that the airbag 20 is folded into an intermediate folded body whose entire length is reduced as illustrated in FIG. 4. The airbag 20 is accordion-folded along the multiple folding lines F1 to F4 aligned in the longitudinal direction of the webbing 11, and is covered by the bag cover 40. By accordion-folding the airbag 20 in the longitudinal direction of the webbing 11, the length in the longitudinal direction of the air belt 10 before inflation can be reduced. Further, the air belt 10 can smoothly extend upward during inflation and deployment.

Figure 5:
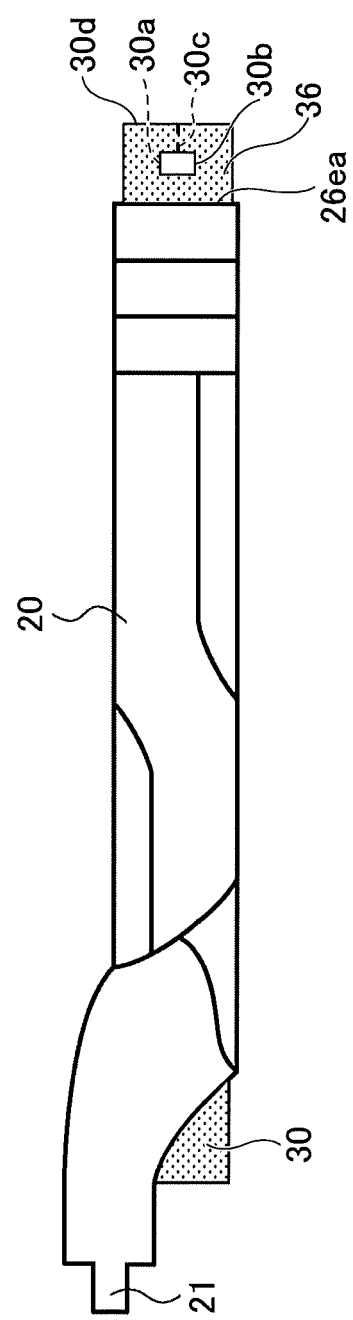
FIG. 5 is a drawing illustrating an example in which the entirety of the airbag is folded.

The folding lines F1 to F4 extend in a direction perpendicular to the longitudinal direction of the airbag 20. This intermediate folded body is folded along folding lines in the longitudinal direction of the airbag 20 so as to envelop the webbing guide 30, and is folded into a folded body as illustrated in FIG. 5. FIG. 5 is a drawing illustrating an example in which the entirety of the airbag is folded. In the state of FIG. 5, the gas inlet port 21 and its vicinity protrude upward. Therefore, although not illustrated, this protruding portion is folded so as to overlap the webbing guide 30. Accordingly, an elongated folded body having a substantially uniform width is formed.

Figure 6:
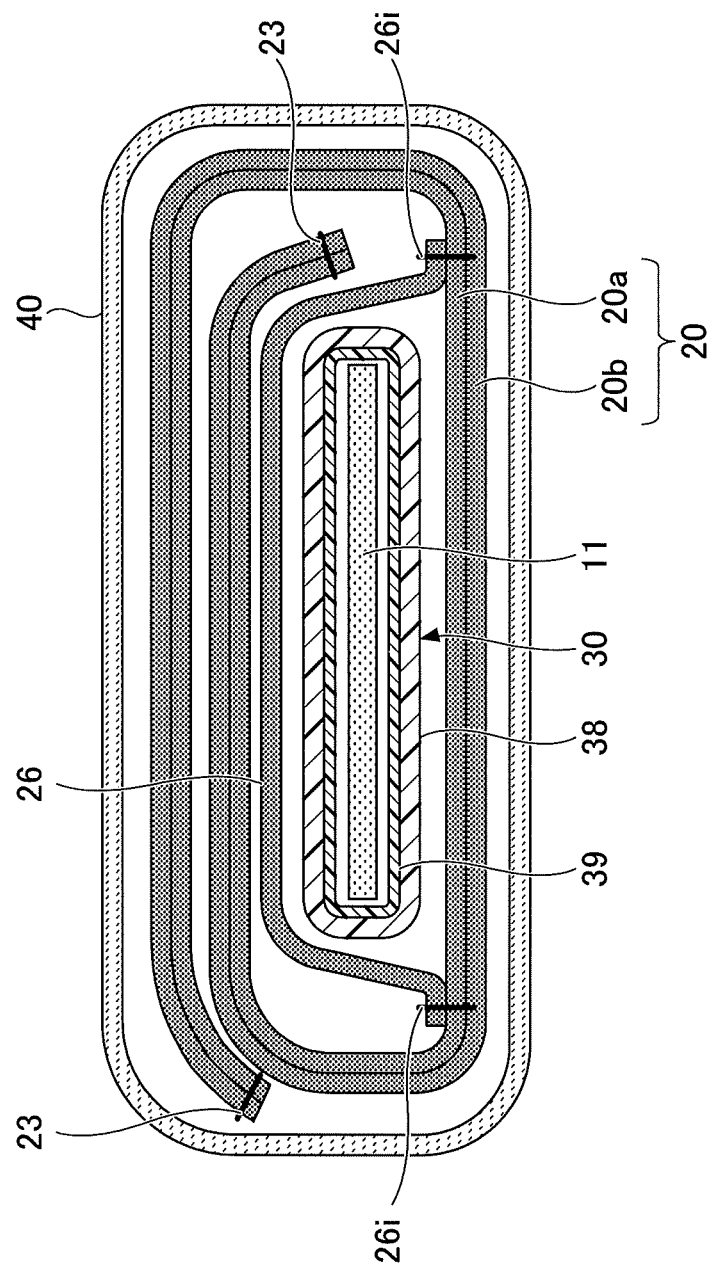
FIG. 6 is a cross-sectional view taken through line D-D of FIG. 2.

As illustrated in FIG. 2 and FIG. 6, the folded body of the webbing guide 30 and the airbag 20 is inserted into the bag cover 40. The bag cover 40 is an example of a cover having a flat and elongated tubular shape. The bag cover 40 is sewn with a sewing thread that may be cut by inflation pressure of the airbag 20. Alternatively, the bag cover 40 may be formed of an elastic mesh that inflates as the airbag 20 inflates. In the present embodiment, the entire lengths of the webbing guide 30 and the bag cover 40 are approximately equal. In addition, the positions of the lower ends and the upper ends of the webbing guide 30 and the bag cover 40 are approximately the same.

FIG. 6 is a cross-sectional view taken through line D-D of FIG. 2. The webbing guide 30 has the peripheral wall 38, which extends continuously between the guide upper end 36 and the guide lower end portion 37 so as to form a space between the peripheral wall 38 and the webbing 11. The space formed between the peripheral wall 38 and the webbing 11 allow the webbing 11 to slide smoothly. Further, a coating 39 formed on the inner peripheral surface of the webbing guide 30 (the inner peripheral surface of the peripheral wall 38) further facilitates the sliding of the webbing 11. For example, with respect to main components of the coating 39, a base binder is preferably a fluorine-based resin, a lubricant is preferably a polytetrafluoroethylene (PTFE) solid lubricant, the amount of the lubricant is preferably 30% to 40%, and an additive is preferably a silicone oil.

Figure 7:
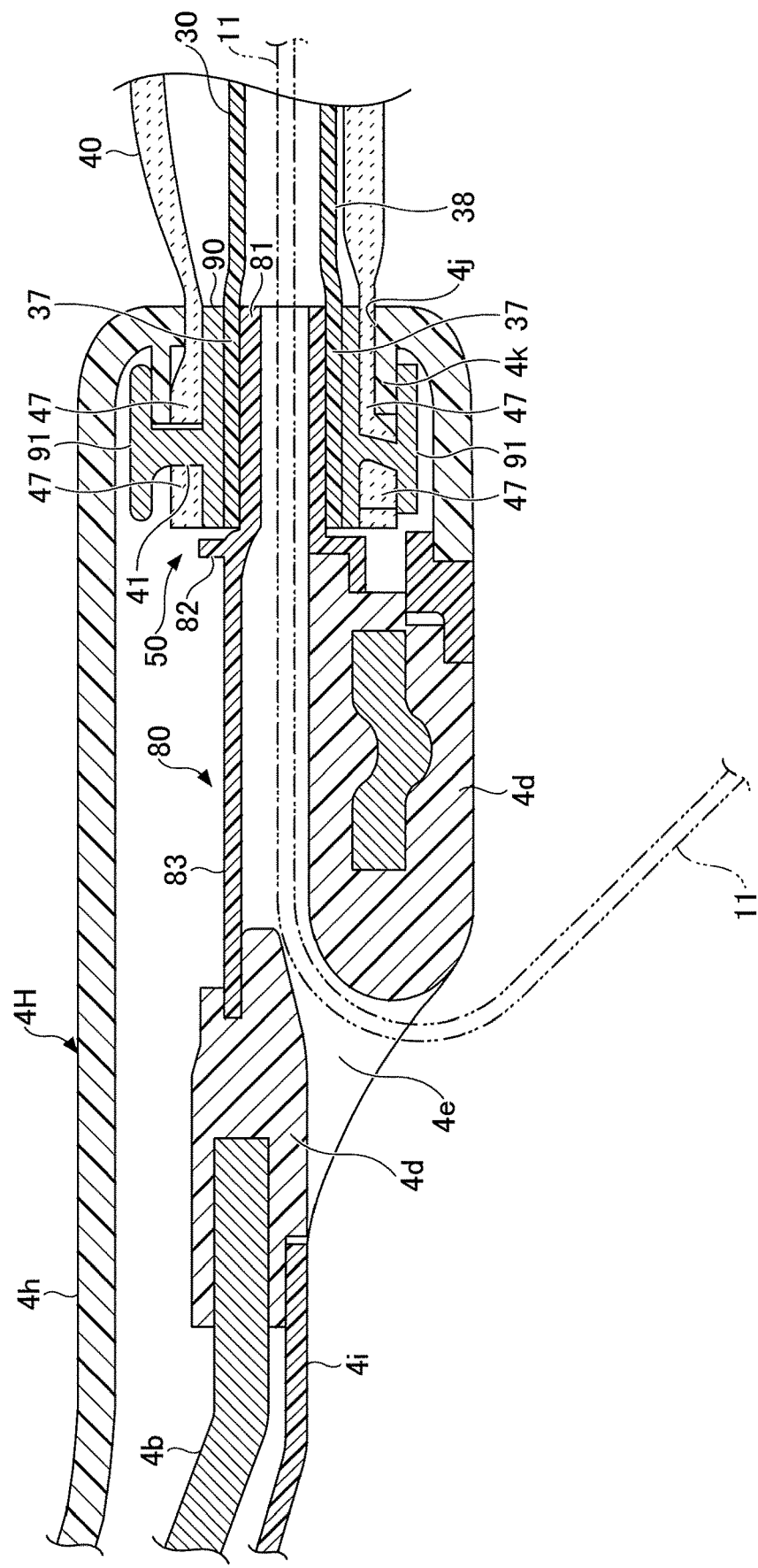
FIG. 7 is a cross-sectional view of an example of a lower portion of an airbag apparatus.

FIG. 7 is a cross-sectional view of an example of a lower portion of the airbag apparatus, in which a cross-sectional view of the lower side coupling member 50 that couples the lower ends (the tongue 4 side) of the webbing guide 30 and the bag cover 40 to the tongue 4 is illustrated. The lower side coupling member 50 includes an inner joint 80, an outer joint 90, and a housing 4H.

The housing 4H surrounds the inner joint 80, the outer joint 90, and the rear part of the tongue 4. The resin mold 4d and the tongue plate 4b are interposed by an upper housing 4h and a lower housing 4i of the housing 4H. The upper housing 4h of the housing 4H is provided with an opening 4j that receives the webbing guide 30 and the bag cover 40, and is also provided with a protruding wall 4k that protrudes from the edge of the opening 4j.

The inner joint 80 has a base portion 81 having a flat annular shape, a projecting portion 83 projecting from the base portion 81 toward the front end of the tongue, and a flange portion 82 standing upward from a boundary between the base portion 81 and the projecting portion 83. The base portion 81 of the inner joint 80 is inserted into the lower end of the webbing guide 30. The inner joint 80 is inserted into the webbing guide 30 until the lower end of the webbing guide 30 comes into contact with the flange portion 82.

The lower end of the webbing guide 30 is fitted on the base portion 81 of the inner joint 80. Also, the outer joint 90 is fitted on the lower end of the webbing guide 30. The lower end of the webbing guide 30 is sandwiched between the outer joint 90 and the base portion 81 of the inner joint 80. Accordingly, the webbing guide 30 is coupled to the inner joint 80.

The outer joint 90 has a flat annular shape and is slightly larger than the base portion 81. The outer joint 90 is provided with a plurality of hooks 91 projecting from the outer surface of the outer joint 90. Hook holes 41 are provided near the lower end of the bag cover 40, and the hooks 91 are fitted in the hook holes 41. After the hooks 91 are fitted in the hook holes 41 of the bag cover 40, the inner joint 80 engages with the resin mold 4d of the tongue 4.

The protruding wall 4k of the upper housing 4h engages with the hook 91. The front end of the projecting portion 83 of the inner joint 80 makes contact with the resin mold 4d in the vicinity of the insertion port 4e of the webbing 11.

As described above, the lower end of the webbing guide 30 is sandwiched between the inner joint 80 and the outer joint 90. Further, the joining surfaces of the webbing guide 30 and the bag cover 40 are hermetically surrounded by the housing 4H. Accordingly, foreign matter is prevented from entering between the mating surfaces of the lower ends of the webbing guide 30 and the bag cover 40.

Figure 8:
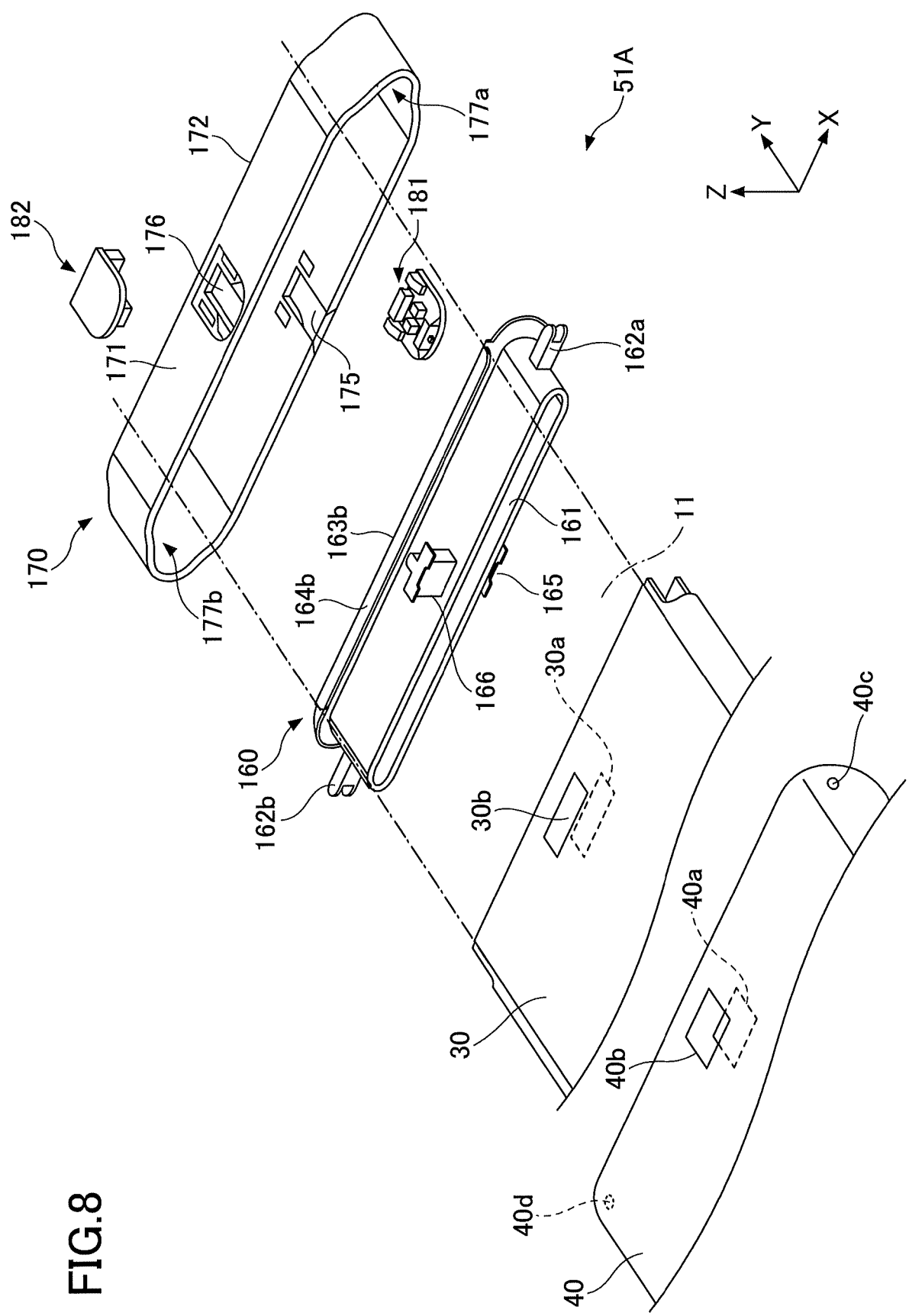
FIG. 8 an exploded perspective view of an example of an upper side coupling member.
Figure 9:
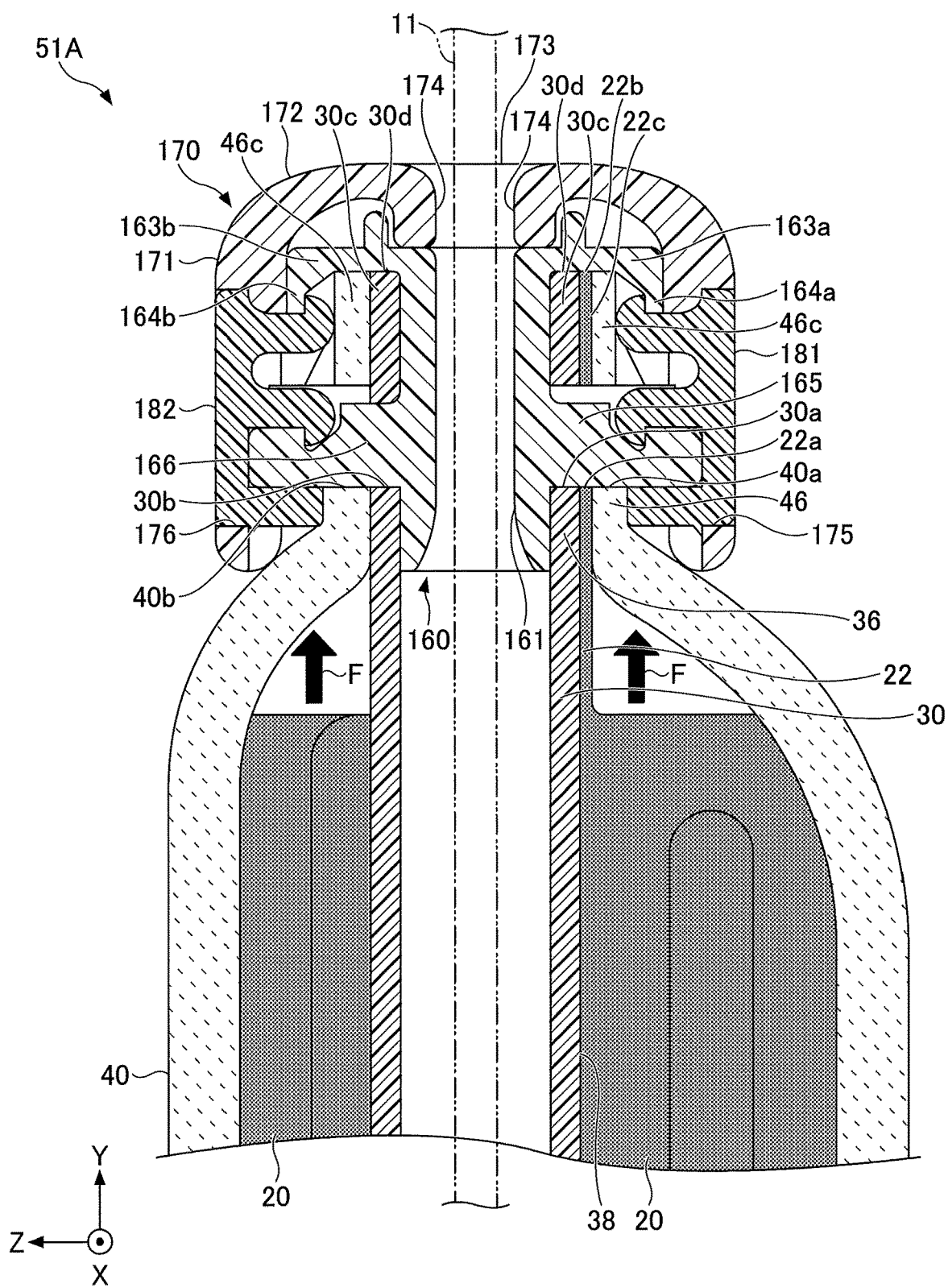
FIG. 9 is a cross-sectional view of an example of an upper portion of the airbag apparatus.

FIG. 8 is an exploded perspective view of an example of the upper side coupling member. FIG. 9 is a cross-sectional view of an example of an upper portion of the airbag apparatus. Next, with reference to FIG. 8 and FIG. 9, a binding structure of the upper ends (the shoulder anchor side) of the airbag 20, the webbing guide 30, and the bag cover 4 will be described. An upper side coupling member 51A illustrated in FIG. 8 and FIG. 9 is an example of the upper side coupling member 51 (see FIG. 2). The upper side coupling member 51A has a guide base 160, a guide cover 170, and a pair of hook pins 181 and 182.

The guide base 160 is preferably made of synthetic resin. The guide cover 170 and the pair of hook pins 181 and 182 are also preferably made of synthetic resin. However, the guide cover 170 and the pair of hook pins 181 and 182 may be made of lightweight aluminium or high-strength wood.

As illustrated in FIG. 9, the airbag 20 is overlaid on the webbing guide 30, and the webbing guide 30 is surrounded by the bag cover 40. The webbing guide 30 has the engaging hole 30a and the bag cover 40 has an engaging hole 40a at positions overlapping the engaging hole 22a. Further, on the side opposite to the side on which the engaging holes 30a and 40a are formed, an engaging hole 40b of the bag cover 40 is formed at a position overlapping the engaging hole 30b of the webbing guide 30.

The guide base 160 is inserted into the upper end of the webbing guide 30. The guide base 160 is an example of a guide base attached to the guide upper end 36. The guide base 160 has a flat annular portion 161 inserted into the webbing guide 30, pillar portions 165 and 166 protruding outward from the flat annular portion 161, and turnaround portions 163a and 163b formed at the upper end of the flat annular portion 161. A tip portion 164a is a tip portion extending along the flat annular portion after the turnaround portion 163a is turned around, and a tip portion 164b is a tip portion extending along the flat annular portion after the turnaround portion 163b is turned around. The first pillar portion 165 protrudes from a first flat surface of the flat annular portion 161, and the second pillar portion 166 protrudes from a second flat surface (a flat surface opposite to the first flat surface) of the flat annular portion 161.

A tip portion 46c of the cover upper end 46 is located inside the turnaround portions 163a and 163b. The guide base 160 is surrounded by the guide cover 170 outside the turnaround portions 163a and 163b. When the guide cover 170 is placed over the guide base 160, the tip portion 164a of the turnaround portion 163a and the tip portion 164b of the turnaround portion 163b prevent the tip portion 46c located inside the turnaround portions 163a and 163b from being turned outward (away from a tip portion 30c of the guide upper end 36).

The guide cover 170 is fitted on the outer side of the guide base 160. The guide cover 170 is an example of a guide cover, and at least the cover upper end 46 is interposed between the guide cover and the guide base 160. In the present embodiment, the guide upper end 36 of the webbing guide 30, the projecting portion 22 of the airbag 20, and the cover upper end 46 of the bag cover 40 are sandwiched between the guide cover 170 and the flat annular portion 161 of the guide base 160.

The guide cover 170 includes a flat annular portion 171 having a flat tubular shape, an end portion 172 provided at one end of the flat annular portion 171, a webbing insertion port 173 provided in the end portion 172, and protruding walls 174 that protrude from the edge of the webbing insertion port 173 toward the inside of the flat annular portion 171. The flat annular portion 171 has cover holes 175 and 176 into which the hook pins 181 and 182 are inserted.

When the guide cover 170 is coupled to the guide base 160, the guide upper end 36 of the webbing guide 30, the projecting portion 22 of the airbag 20, and the cover upper end 46 of the bag cover 40 are sandwiched between the guide base 160 and the guide cover 170. The hook pins 181 and 182 are members that are fitted to the pillar portions 165 and 166 of the guide base 160, such that the guide cover 170 is coupled to the guide base 160. Specifically, the guide cover 170 is coupled to the guide base 160 by pushing the hook pins 181 and 182 into the pillar portions 165 and 166 through the cover holes 175 and 176 after the guide cover 170 is fitted on the outer side of the guide base 160.

As described above, the upper ends of the airbag 20, the webbing guide 30, and the bag cover 40 are sandwiched between the guide base 160 and the guide cover 170. Further, the joining surfaces (end surfaces) of the airbag 20, the webbing guide 30, and the bag cover 40 are surrounded by the guide base 160 and the guide cover 170. Accordingly, it is possible to prevent foreign matter from entering between the airbag 20 and the bag cover 40.

In particular, in the present embodiment, the pillar portion 165 is inserted through the engaging hole 22a, 30a, and 40a of the airbag 20, the webbing guide 30, and the bag cover 40, and the pillar portion 166 is inserted through the engaging hole 30b and 40b of the webbing guide 30 and the bag cover 40. Therefore, the strength of coupling the airbag 20, the webbing guide 30, and the bag cover 40 to the guide base 160 and the guide cover 170 is high.

Figure 14:
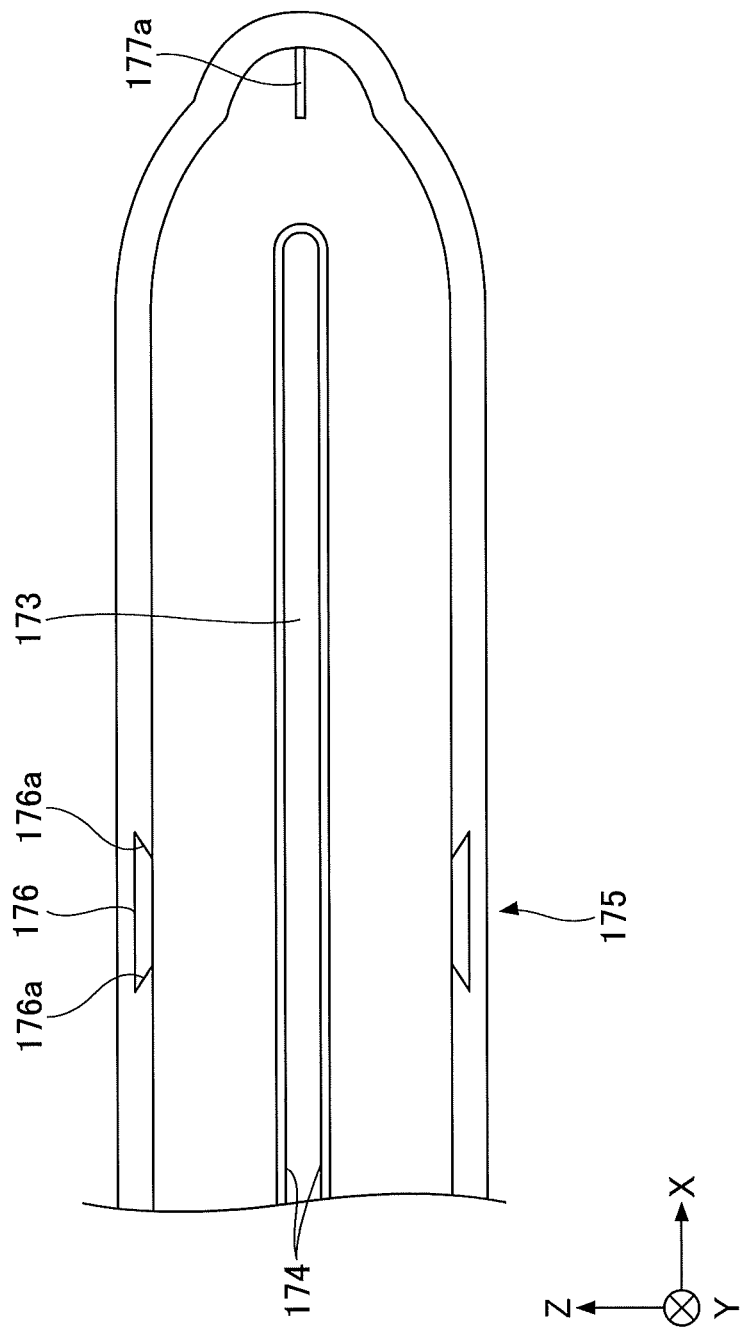
FIG. 14 is a bottom view of a guide cover.

In FIG. 8, the guide base 160 has a pair of arms 162a and 162b protruding from both sides of the flat annular portion 161. The guide cover 170 has a pair of ribs 177a and 177b on the inner surface of the flat annular portion 171. The rib 177a is illustrated in FIG. 14, which will be described below. The rib 177b has the same shape as the rib 177a. The bag cover 40 has an engaging hole 40c through which the arm 162a passes, and has an engaging hole 40d through which the arm 162b passes. When the bag cover 40 is coupled to the guide base 160 together with the webbing guide 30, the arm 162a is inserted through the engaging hole 40c, and the arm 162b is inserted through the engaging hole 40d. When the guide base 160 is coupled to the guide cover 170, the arms 162a and 162b are fitted to the ribs 177a and 177b. Accordingly, the strength of coupling the upper side coupling member 51A to the bag cover 40 is enhanced.

The X-axis direction indicates the width direction of the webbing guide 30. The Y-axis direction indicates the longitudinal direction of the webbing guide 30. The Z-axis direction indicates the thickness direction of the webbing guide 30.

Next, the behavior of the upper side coupling member 51A when the airbag 20 is inflated and deployed will be described.

In FIG. 9, when the airbag 20 starts to inflate and deploy, the airbag 20 starts pushing the inner surface of the bag cover 40 with force F. When a certain level of force F is applied to the bag cover 40, the bag cover 40 ruptures to thereby expose the airbag 20 as it is inflated and deployed.

Figure 10:
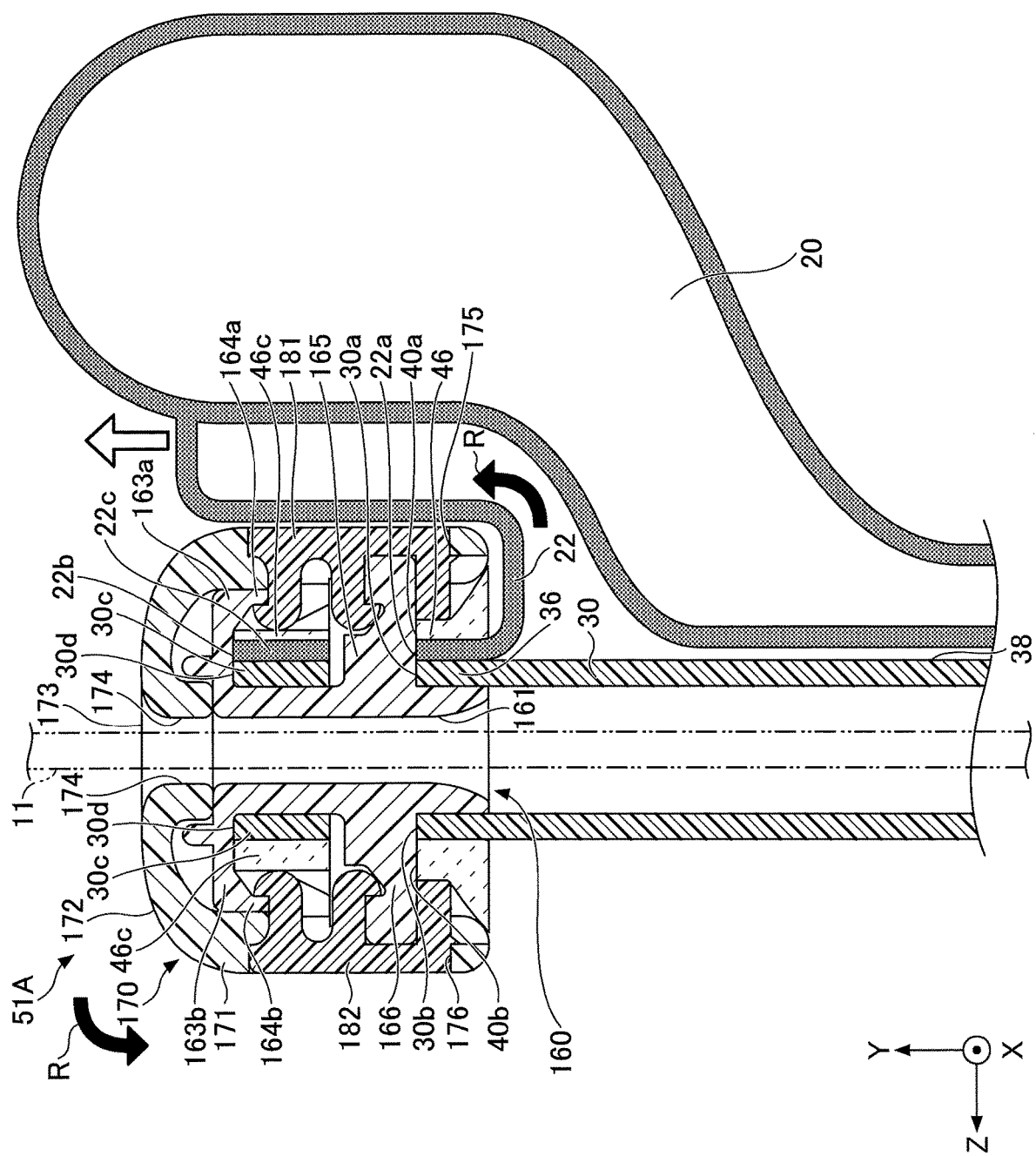
FIG. 10 is a drawing schematically illustrating an example of an inflated and deployed state of the airbag.

FIG. 10 is a drawing schematically illustrating an example of an inflated and deployed state of the airbag 20.

In FIG. 10, a part of the bag cover 40 is not depicted for the sake of convenience. Upon inflation and deployment of the airbag 20, an upward force, generated by the inflation and deployment of the airbag 20, is exerted on the upper side coupling member 51A, and the airbag 20 attempts to move upward together with the projecting portion 22. Meanwhile, the webbing guide 30 and the bag cover 40 are fixed to the tongue 4 by the lower side coupling member 50.

Accordingly, the tip portion 30c of the guide upper end 36 and the tip portion 46c of the cover upper end 46 are cut by the pillar portions 165 and 166 of the guide base 160 that are moved upward by inflation and deployment of the airbag 20. The tip portion 30c is a portion located between the engaging holes 30a and 30b of the guide upper end 36 and the upper end 30d of the guide upper end 36. Because the tip portion 30c and the tip portion 46c are cut, the upper side coupling member 51A separates from the guide upper end 36 and the cover upper end 46, and moves upward along the webbing 11 together with airbag 20. Namely, the upper side coupling member 51A leaves the guide upper end 36 and the cover upper end 46 downward, and moves upward along the webbing 11 together with airbag 20.

Conversely, because both the projecting portion 22 and the pillar portions 165 and 166 attempt to move upward, a tip portion 22c of the projecting portion 22 is not cut by the pillar portions 165 and 166 that move upward. The tip portion 22c is a portion located between the engaging hole 22a of the projecting portion 22 and an edge 22b of the projecting portion 22. Because the tip portion 22c is not cut, the upper side coupling member 51A moves upward along the webbing 11 together with the airbag 20 while remaining coupled to the projecting portion 22 of the airbag 20.

Figure 11:
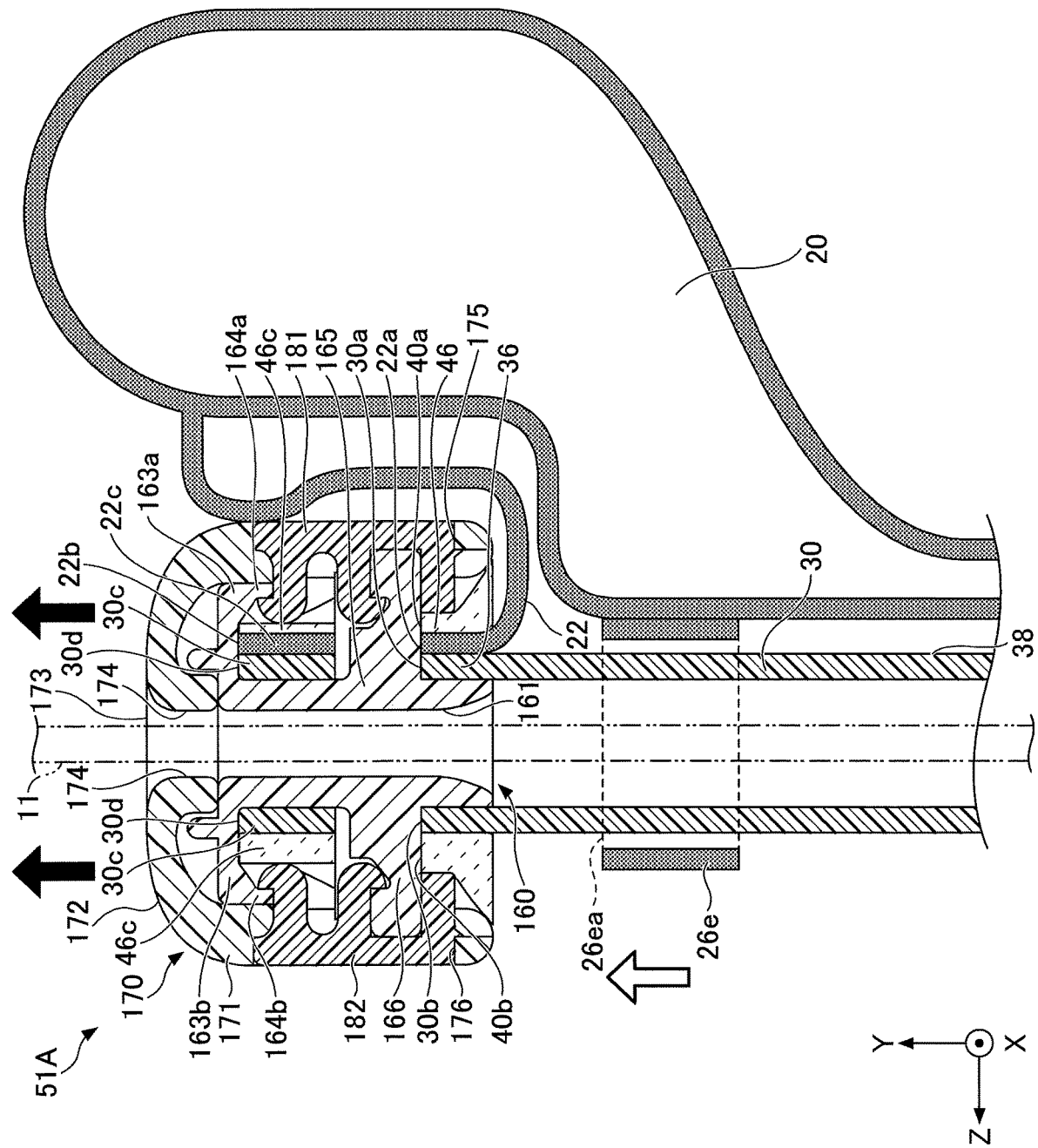
FIG. 11 is a drawing schematically illustrating another example of an inflated and deployed state of the airbag.

FIG. 11 is a drawing schematically illustrating another example of an inflated and deployed state of the airbag 20. In FIG. 11, a part of the bag cover 40 is not depicted for the sake of convenience. Similar to FIG. 10, in FIG. 11, upon inflation and deployment of the airbag 20, an upward force, generated by the inflation and deployment of the airbag 20, is exerted on the upper side coupling member 51A, and the airbag 20 attempts to move upward together with the projecting portion 22. Meanwhile, the webbing guide 30 and the bag cover 40 are fixed to the tongue 4 by the lower side coupling member 50. Therefore, similar to FIG. 10, the upper side coupling member 51A separates from the guide upper end 36 and the cover upper end 46, and moves upward along the webbing 11 together with the airbag 20 while remaining coupled to the projecting portion 22 of the airbag 20.

As illustrated in FIG. 11, it is preferable to provide the loop 26e (see FIG. 3 and FIG. 4). When the airbag 20 is inflated and deployed, the airbag 20 moves upward together with the loop 26e. Thus, an edge 26ea of the loop 26e abuts the upper side coupling member 51A. Accordingly, while the projecting portion 22 remains loose, the edge 26ea of the loop 26e causes, ahead of the projecting portion 22, the entire upper side coupling member 51A to be lifted from below. Thus, rotational force R (see FIG. 10) acting on the upper side coupling member 51A is reduced, allowing the upper side coupling member 51A to smoothly move upward along the webbing 11.

Next, a coupling structure of the upper side coupling member 51A will be described.

Figure 12:
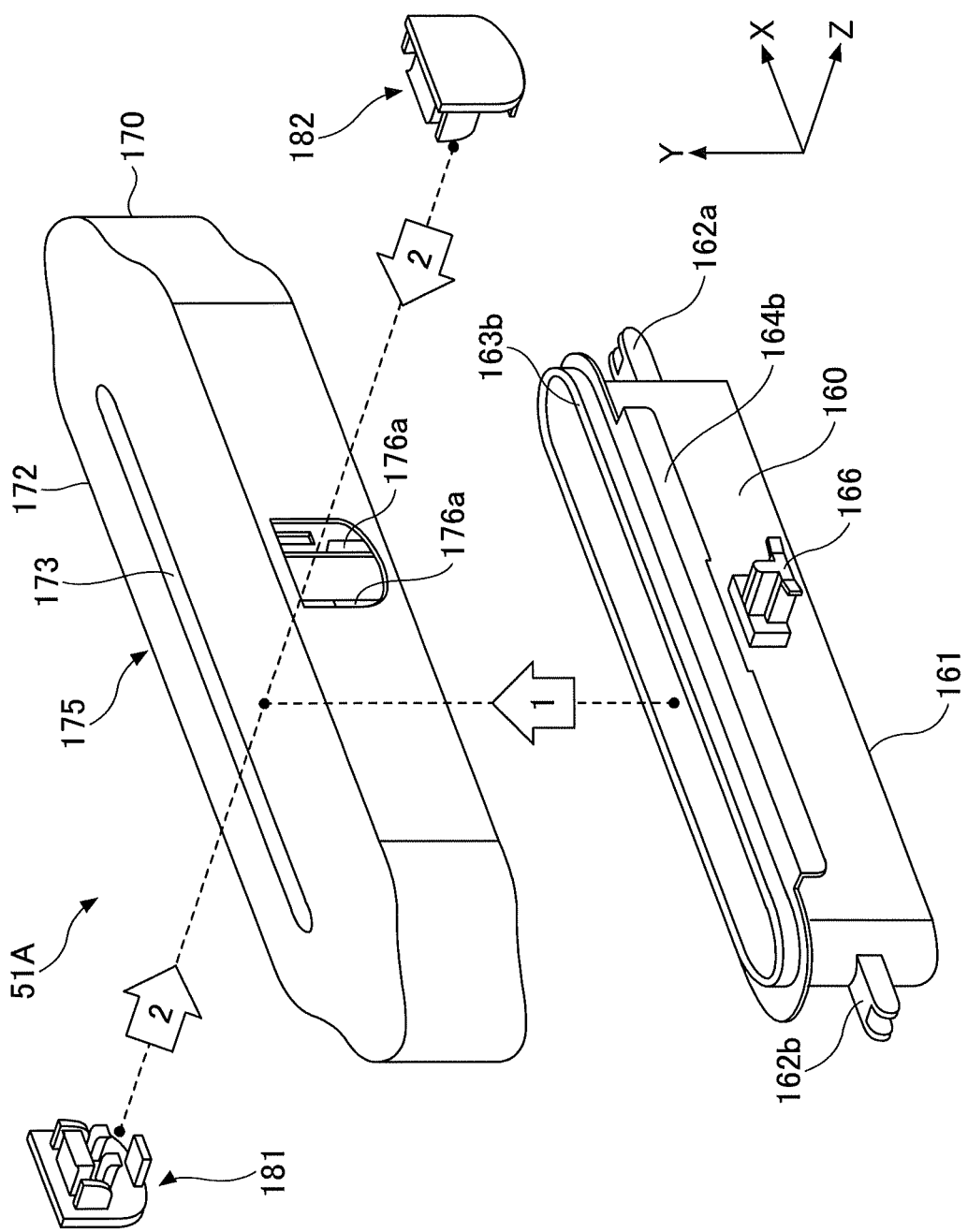
FIG. 12 is an exploded view of an example of the upper side coupling member.
Figure 13:
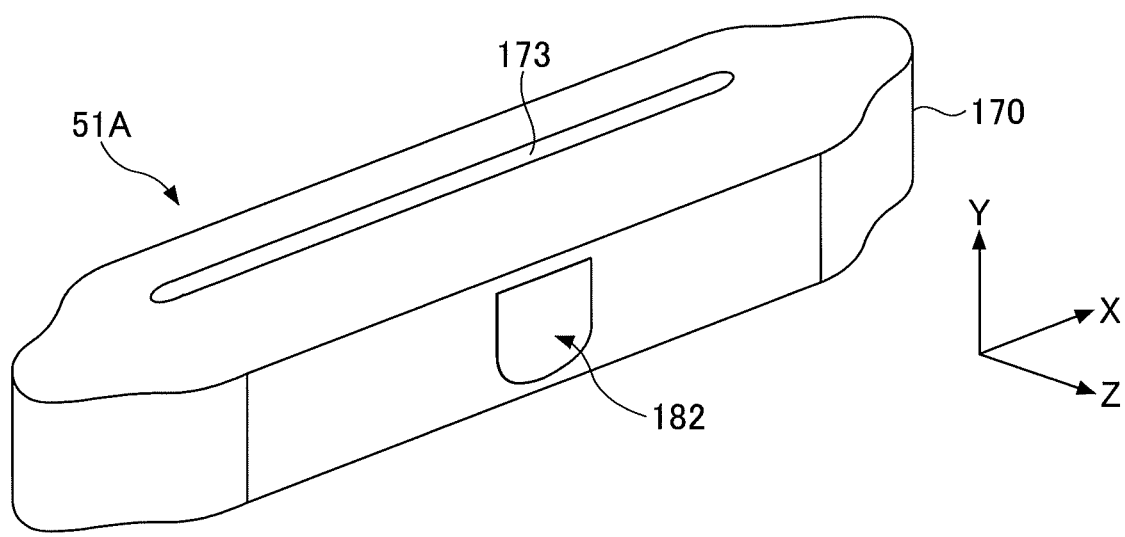
FIG. 13 is a perspective view of the example the upper side coupling member.

FIG. 12 is an exploded view of an example of the upper side coupling member. FIG. 13 is a perspective view of the example the upper side coupling member.

The upper side coupling member 51A illustrated in FIG. 12 and FIG. 13 has a multi-layered structure of the guide cover 170 and the guide base 160, and is easily assembled by inserting the hook pins 181 and 182 from both sides of the multi-layered structure.

FIG. 14 is a bottom view of the guide cover 170. The cover hole 176 has sloped slides 176a. The cover hole 175 has the same shape as the cover hole 176.

Figure 15:
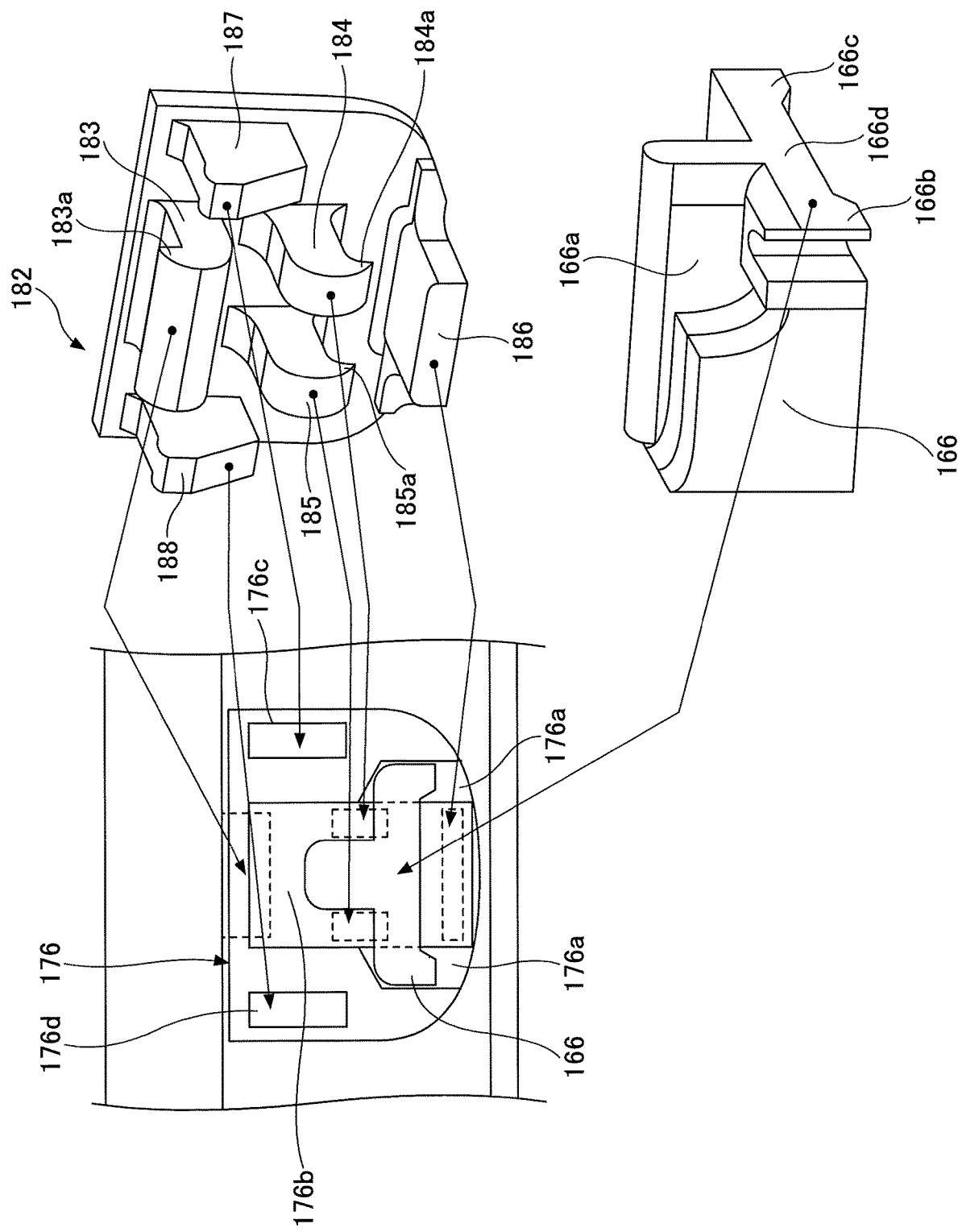
FIG. 15 is a drawing illustrating mounting positions of the guide cover, a guide base, and a hook pin.

FIG. 15 is a drawing illustrating mounting positions of the guide cover, the guide base, and the hook pin. FIG. 15 illustrates the cover hole 176 side. The cover hole 175 side is same as FIG. 15. The left side of FIG. 15 depicts a state in which the guide base 160 is inserted into the guide cover 170 from below.

The pillar portion 166 of the guide base 160 has a base portion 166a. As described above, the tip portion 30c of the guide upper end 36 and the tip portion 46c of the cover upper end 46 are cut by the base portion 166a. A hook wall 166d of the base portion 166a has a plurality of hook portions 166b and 166c. When the guide base 160 is inserted into the guide cover 170 from below, the hook portions 166b and 166c slide along the sloped slides 176a.

The cover hole 176 has mounting holes 176b, 176c, and 176d. The hook pin 182 has a plurality of hooks 183 through 188. The hooks 183, 184, 185, and 186 are inserted into the mounting hole 176b. The hook 187 is inserted into the mounting hole 176c. The hook 188 is inserted into the mounting hole 176d.

Figure 16:
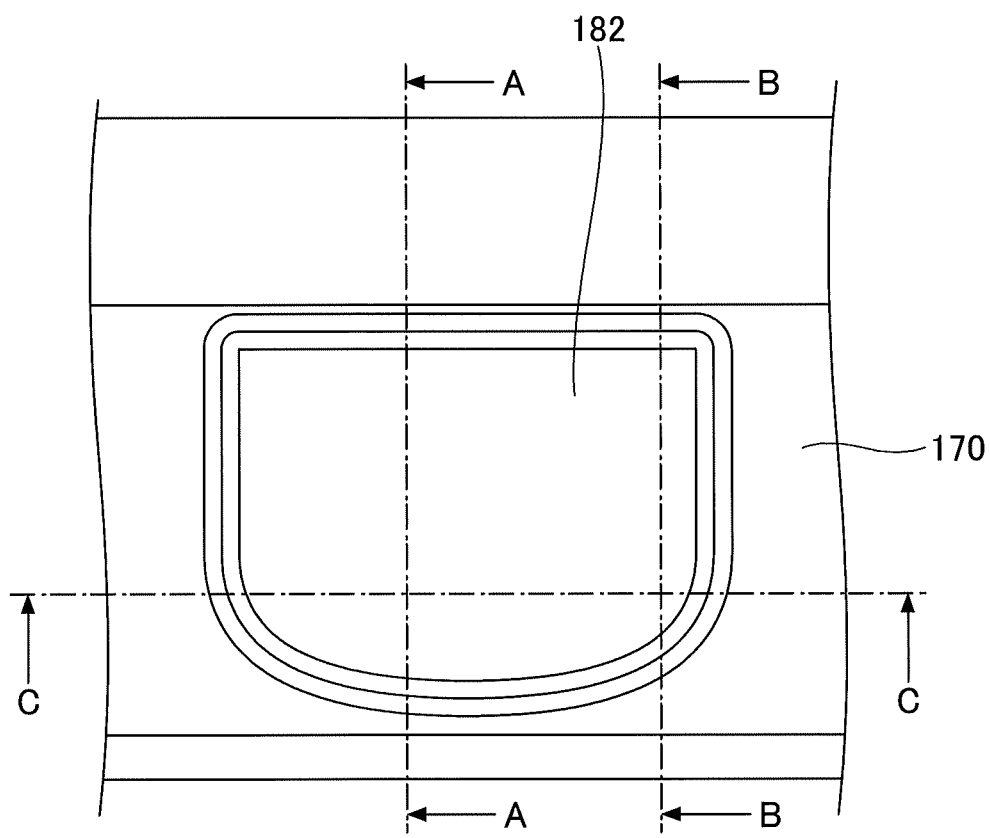
FIG. 16 is a front view of the guide cover on which the hook pin has been mounted.
Figure 17:
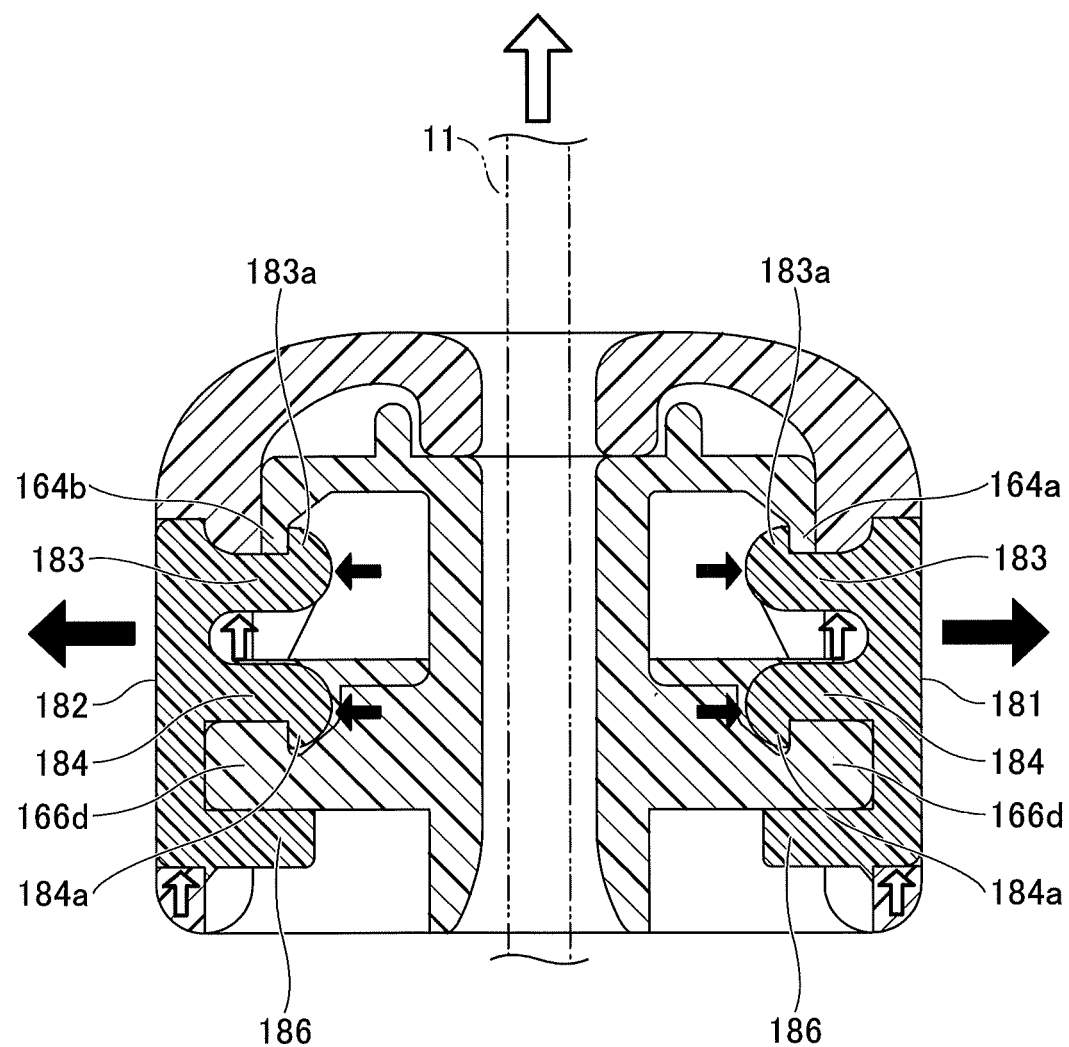
FIG. 17 is a cross-sectional view taken through line A-A of FIG. 16.
Figure 18:
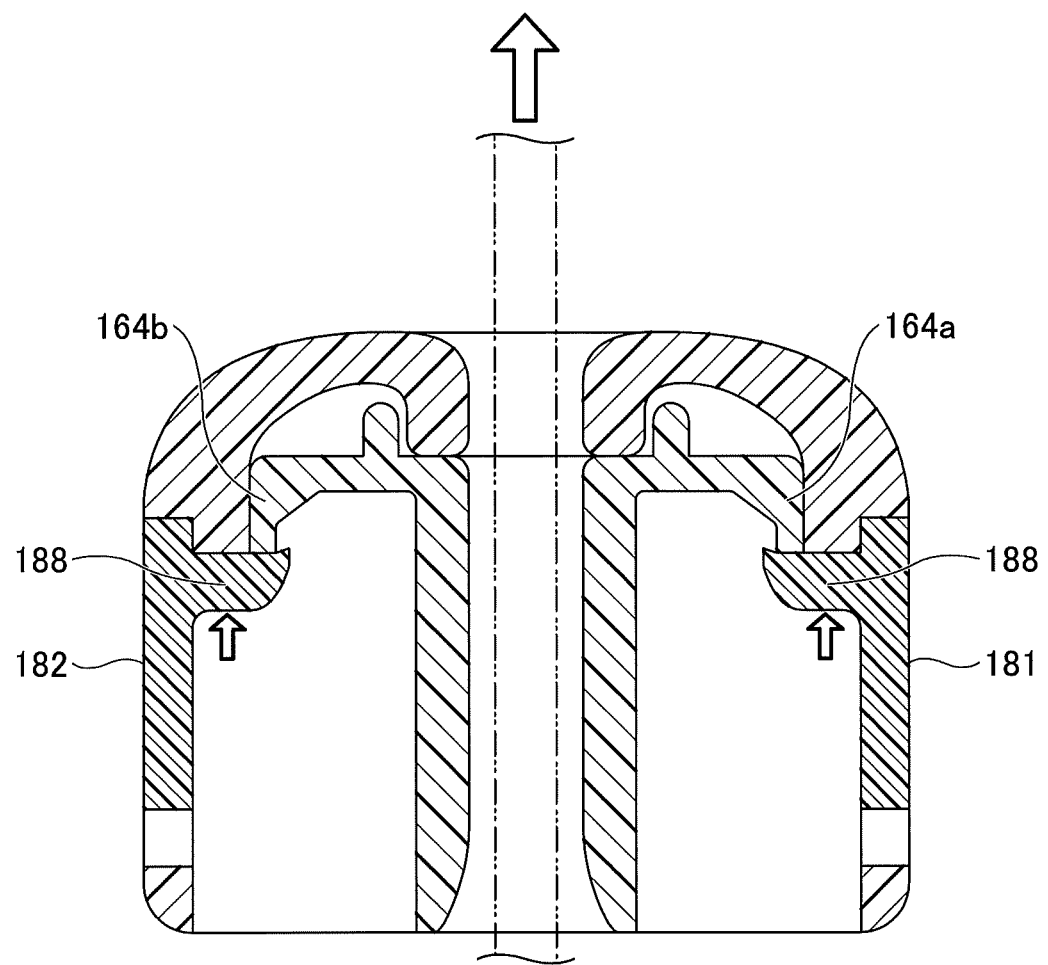
FIG. 18 is a cross-sectional view taken through line B-B of FIG. 16.
Figure 19:
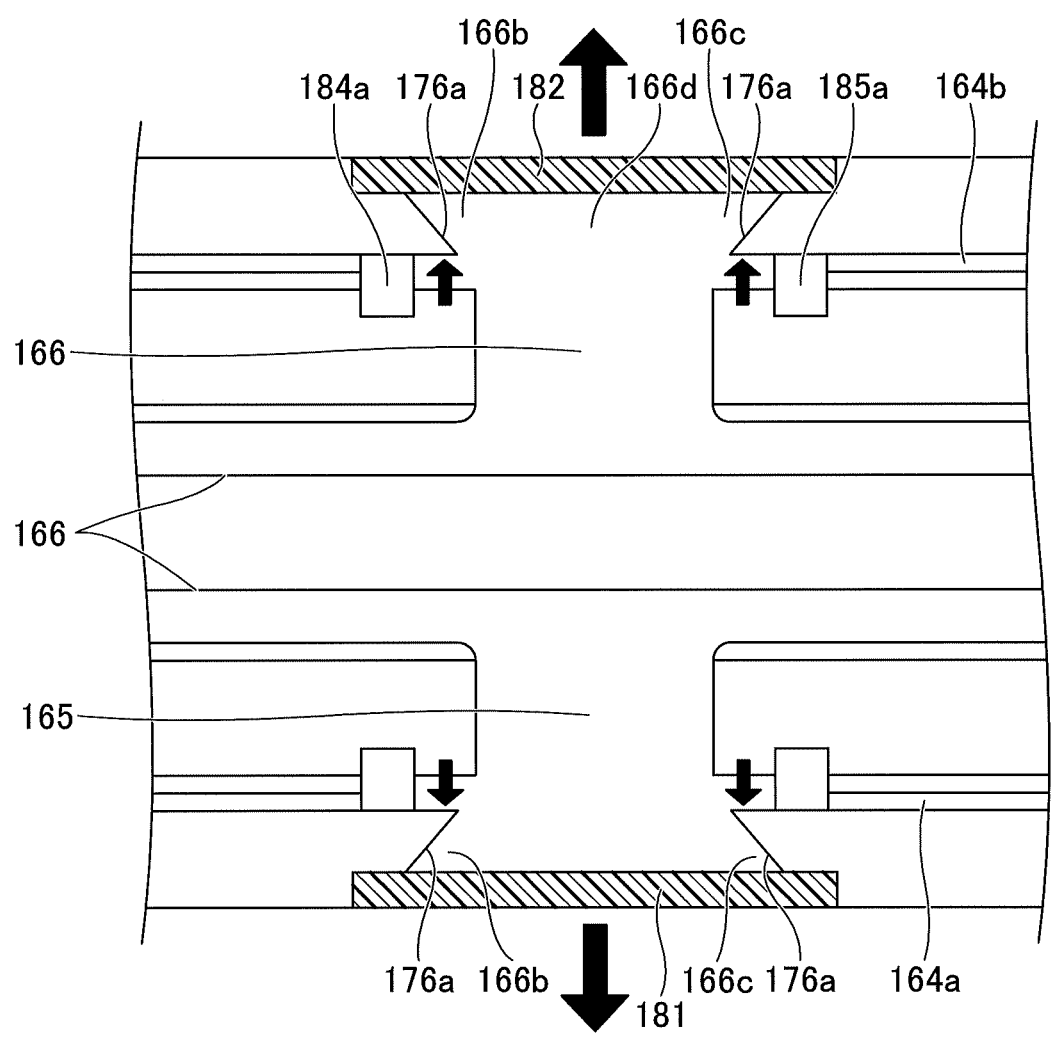
FIG. 19 is a cross-sectional view taken through line C-C of FIG. 16.

FIG. 16 is a front view of the guide cover 170 on which the hook pin 182 has been mounted. FIG. 17 is a cross-sectional view taken through line A-A of FIG. 16. FIG. 18 is a cross-sectional view taken through line B-B of FIG. 16. FIG. 19 is a cross-sectional view taken through line C-C of FIG. 16.

In FIG. 17, claws 183a of the hooks 183 are fitted to the tip portions 164a and 164b of the guide base 160 upwardly. Claws 184a of the hooks 184 are fitted to the hook walls 166d of the guide base 160 downwardly. In FIG. 18, hooks 188 are fitted to the tip portions 164a and 164b of the guide base 160 upwardly. Similar to the hooks 188, hooks 187 (see FIG. 15) are fitted to the tip portions 164a and 164b of the guide base 160 upwardly. Accordingly, by fitting the hooks, the coupling strength in the upper-lower direction can be enhanced.

Further, in FIG. 17, one of the claws 183a of the hooks 183 is fitted to the tip portion 164a of the guide base 160 towards the right, and the other of the claws 183a of the hooks 183 is fitted to the tip portion 164b of the guide base 160 towards the left. One of the claws 184a of the hooks 184 is fitted to the hook wall 166d of the guide base 160 towards the right, and the other of the claws 184a of the hooks 184 is fitted to the hook wall 166d of the guide base 160 towards the left. In FIG. 19, each of the hook portions 166b and 166c is fitted to a corresponding sloped slide 176a towards the right or towards the left. Accordingly, by fitting the hooks, the coupling strength in the right-left direction can be enhanced.

Although the airbag apparatus and the seatbelt apparatus have been described with reference to the embodiments, the present invention is not limited to the above-described embodiments. Various variations and modifications, such as combinations and substitutions with some or all of the other embodiments, may be made without departing from the scope of the present invention.

For example, the coupling structure of the guide base 160 and the guide cover 170 is not limited to the configuration using the hook pins. A configuration in which the guide base 160 is coupled to the guide cover 170 by fastening members such as screws and rivets may be employed, or a configuration in which the guide base 160 is bonded to the guide cover 170 with adhesives or by welding may be employed. The hook pins may be integrally formed with the guide cover 170.

Further, the webbing guide is not limited the tubular-shaped member, and may be a plate-shaped member.

The present application is based on and claims priority to Japanese patent application No. 2017-100586 filed on May 22, 2017, with the Japanese Patent Office, the entire contents of which are hereby incorporated by reference.

DESCRIPTION OF REFERENCE SYMBOLS 1 seat
2 retractor
4 tongue
4b tongue plate
4d resin mold
4H housing
7 shoulder anchor
9 buckle
10 air belt (an example of airbag apparatus)
11 webbing
16 inflator
20 airbag
21 gas inlet port
22 projecting portion (an example of bag upper end)
30 webbing guide
36 guide upper end
37 guide lower end portion
38 peripheral wall
40 bag cover
40a, 40b, 40c, 40d engaging holes
41 hook hole
46 cover upper end
46c tip portion
47 cover lower end
51 upper side coupling member
100 seatbelt apparatus
160 guide base
161 flat annular portion
162a, 162b arms
163a, 163b turnaround portions
164a, 164b tip portions
165, 166 pillar portions
170 guide cover
171 flat annular portion
173 webbing insertion port
174 protruding wall
175, 176 cover holes
181, 182 hook pins

The invention claimed is:

1. An airbag apparatus comprising:
a longitudinal webbing guide configured to guide movement in a longitudinal direction of webbing;
an inflatable airbag disposed along an outer side of the webbing guide;
a bag cover configured to cover the airbag; and
an upper side coupling member configured to couple a guide upper end of the webbing guide to a cover upper end of the bag cover, and move upward along the webbing together with the airbag when the airbag is inflated and deployed.

2. The airbag apparatus according to claim 1, wherein the upper side coupling member moves upward along the webbing together with the airbag, while remaining coupled to a bag upper end of the airbag.

3. The airbag apparatus according to claim 1, wherein the airbag has a loop through which the webbing guide passes, and
the loop causes the upper side coupling member to be lifted when the airbag is inflated and deployed.

4. The airbag apparatus according to claim 1, wherein the airbag is accordion-folded along a plurality of folding lines aligned in the longitudinal direction of the webbing, and is covered by the bag cover.

5. A seatbelt apparatus comprising:
the webbing; and
the airbag apparatus according to claim 1.

6. The airbag apparatus according to claim 1, wherein, when the airbag is inflated and deployed, the upper side coupling member is separated from the guide upper end and the cover upper end, and moves upward along the webbing together with the airbag.

7. The airbag apparatus according to claim 6, wherein, when the airbag is inflated and deployed, the upper side coupling member cuts the guide upper end and the cover upper end, and moves upward along the webbing together with the airbag.

8. The airbag apparatus according to claim 7, wherein the upper side coupling member has a pillar portion, the pillar portion being inserted into a hole formed in the guide upper end and a hole formed in the cover upper end, and
the guide upper end and the cover upper end are cut by the pillar portion as the pillar portion is moved when the airbag is inflated and deployed.

9. The airbag apparatus according to claim 1, wherein the upper side coupling member includes a guide base and a guide cover, the guide base being attached to the guide upper end, and at least the cover upper end being interposed between the guide base and the guide cover.

10. The airbag apparatus according to claim 9, wherein the upper side coupling member has a hook pin, and the guide base is coupled to the guide cover by fitted the hook pin to the guide base.

11. The airbag apparatus according to claim 9, wherein the guide base has a turnaround portion at an upper end of the guide base, a tip portion of the cover upper end is located inside the turnaround portion, and the guide base is surrounded by the guide cover outside the turnaround portion.

* * * * *